United States Patent
Nakamura et al.

(10) Patent No.: US 11,194,078 B2
(45) Date of Patent: Dec. 7, 2021

(54) ANTIREFLECTION FILM HAVING SILVER-CONTAINING LAYER AND FLUOROCARBON LAYER, METHOD FOR PRODUCING ANTIREFLECTION FILM, OPTICAL ELEMENT, AND OPTICAL SYSTEM

(71) Applicant: FUJIFILM Corporation, Tokyo (JP)

(72) Inventors: Seigo Nakamura, Kanagawa (JP); Kenichi Umeda, Kanagawa (JP); Yuichiro Itai, Kanagawa (JP); Shinichiro Sonoda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 381 days.

(21) Appl. No.: 16/288,768

(22) Filed: Feb. 28, 2019

(65) Prior Publication Data
US 2019/0196064 A1      Jun. 27, 2019

Related U.S. Application Data

(63) Continuation of application No. PCT/JP2017/032118, filed on Sep. 6, 2017.

(30) Foreign Application Priority Data

Sep. 12, 2016   (JP) .............................. JP2016-177505

(51) Int. Cl.
*G02B 1/111* (2015.01)
*G02B 1/113* (2015.01)
(Continued)

(52) U.S. Cl.
CPC ................ *G02B 1/111* (2013.01); *B32B 7/02* (2013.01); *B32B 9/00* (2013.01); *B32B 15/04* (2013.01);
(Continued)

(58) Field of Classification Search
CPC .............. G02B 1/111–116; G02B 1/18; G02B 15/20; B32B 7/02; B32B 9/00; B32B 15/04; B32B 27/00
See application file for complete search history.

(56) References Cited

U.S. PATENT DOCUMENTS

2007/0166522 A1   7/2007   Beinat et al.
2013/0308192 A1   11/2013  Shimoda
2020/0209436 A1*  7/2020   Nakamura .......... C03C 17/3482

FOREIGN PATENT DOCUMENTS

JP        2001-324601 A      11/2001
JP        2004-334012 A      11/2004
(Continued)

OTHER PUBLICATIONS

International Preliminary Report on Patentability for PCT/JP2017/032118 (PCT/IPEA/409) completed on May 23, 2018.
(Continued)

*Primary Examiner* — Ryan S Dunning
(74) *Attorney, Agent, or Firm* — Birch, Stewart, Kolasch & Birch, LLP

(57) ABSTRACT

Provided is an antireflection film that is formed by laminating an interlayer, a silver-containing metal layer containing silver, and a dielectric layer, in this order, on a substrate, in which the interlayer is a multilayer film having two or more layers, in which a layer of high refractive index having a relatively high refractive index and a layer of low refractive index having a relatively low refractive index are alternately laminated, and the dielectric layer has a surface to be exposed to air and is a multilayer film having two or more layers including an oxide layer and a fluorocarbon layer which is a self-assembled film that is formed by a silane coupling reaction to the oxide layer in this order.

12 Claims, 5 Drawing Sheets

(51) Int. Cl.
  *G02B 1/18* (2015.01)
  *B32B 15/04* (2006.01)
  *B32B 7/02* (2019.01)
  *B32B 9/00* (2006.01)
  *B32B 27/00* (2006.01)
  *G02B 15/14* (2006.01)

(52) U.S. Cl.
  CPC .............. *B32B 27/00* (2013.01); *G02B 1/113* (2013.01); *G02B 1/18* (2015.01); *G02B 15/145* (2019.08)

(56) References Cited

FOREIGN PATENT DOCUMENTS

| | | |
|---|---|---|
| JP | 2006-039006 A | 2/2006 |
| JP | 2007-206146 A | 8/2007 |
| JP | 2009-521001 A | 5/2009 |
| JP | 2013-238709 A | 11/2013 |
| JP | 2014-130294 A | 7/2014 |

OTHER PUBLICATIONS

International Search Report for PCT/JP2017/032118 (PCT/ISA/210) dated Oct. 24, 2017.
Written Opinion of the International Searching Authority for PCT/JP2017/032118 (PCT/ISA/237) dated Oct. 24, 2017.
English Translation of International Preliminary Report on Patentability for PCT/JP2017/032118 (PCT/IPEA/409) completed on May 23, 2018.

\* cited by examiner

ANTIREFLECTION FILM HAVING SILVER-CONTAINING LAYER AND FLUOROCARBON LAYER, METHOD FOR PRODUCING ANTIREFLECTION FILM, OPTICAL ELEMENT, AND OPTICAL SYSTEM

CROSS-REFERENCE TO RELATED APPLICATIONS

This application is a continuation application of International Application No. PCT/JP2017/032118, filed Sep. 6, 2017, the disclosure of which is incorporated herein by reference in its entirety. Further, this application claims priority from Japanese Patent Application No. 2016-177505, filed Sep. 12, 2016, the disclosure of which is incorporated herein by reference in its entirety.

BACKGROUND OF THE INVENTION

1. Field of the Invention

The present invention relates to an antireflection film, a method for producing an antireflection film, an optical element including an antireflection film, and an optical system including the optical element.

2. Description of the Related Art

In the related art, in a lens (transparent substrate) formed of a light transmitting member such as glass or a plastic, an antireflection film is provided on a light incident surface in order to reduce the loss of transmitted light caused by surface reflection.

As an antireflection film that exhibits a very low reflectivity with respect to visible light, constitutions of a fine uneven structure having a pitch shorter than the wavelength of visible light and a porous structure obtained by forming a large number of pores on the uppermost layer thereof are known. In a case of using an antireflection film having a structure layer of a fine uneven structure, a porous structure, or the like on the uppermost layer as a layer of low refractive index, an ultra-low reflectivity of 0.2% or less can be obtained in a wide wavelength range of a visible light region. However, since these films have a fine structure on the surface thereof, there are defects that the film has low mechanical strength and is very weak to an external force such as wiping. Therefore, portions such as outermost surfaces (first lens front surface and final lens back surface) of a group lens used for a camera lens or the like, which are touched by a user, cannot be subjected to ultra-low reflectivity coating having a structure layer.

On the other hand, as an antireflection film not including a structure layer on the surface thereof, an antireflection film including a metal layer in a laminate of dielectric films is proposed in JP2007-206146A, JP2013-238709A, JP2004-334012A, and the like.

JP2007-206146A discloses that although silver is preferable as a constitutional substance of a metal layer included in an antireflection film, silver is deteriorated and aggregated due to contaminants in the environment, water, oxygen, alkali halogen, and the like and thus an alloy that contains one or more metals of noble metals that are stable to the environment such as gold, platinum, palladium, and the like and rare earths in silver is also preferable. In addition, JP2007-206146A discloses that it is preferable to provide an antifouling layer for preventing adhesion of dirt to the surface of an antireflection film, and for the antifouling layer, organic fluorine compounds and the like may be used.

JP2013-238709A proposes a constitution in which a metal layer containing silver is provided between a laminate formed by alternately laminating a layer of low refractive index and a layer of high refractive index, and a dielectric layer with a surface to be exposed to air in order to realize lower reflectivity.

JP2004-334012A proposes a constitution in which a silicon nitride layer is provided above and below a silver layer in order to prevent oxidation of the silver layer.

SUMMARY OF THE INVENTION

In the antireflection film in which the laminate, the metal layer containing silver, and the dielectric layer are laminated in order disclosed in JP2013-238709A, it is possible to obtain very good antireflection performance.

However, silver is easily oxidized, and in particular, halogen resistance against salt water or the like is low. Moisture and chlorine ions mainly invade from the surface to be exposed to air of the antireflection film, reach the metal layer containing silver, and cause the silver to be oxidized. As a result, an antireflection function is lowered. In the antireflection film disclosed in JP2013-238709A, measures for suppressing deterioration of silver are not taken and thus durability is not sufficient.

In JP2007-206146A, it is proposed to make an alloy containing a noble metal and a rare earth metal in order to stabilize environmentally unstable silver. However, as the content of metals other than silver increases, the reflectivity and absorption increase (transmittance decreases), and thus it is difficult to realize an ultra-low reflective film. Therefore, this case is not preferable. In addition, in JP2007-206146A, it is disclosed that an antifouling layer is provided on the outermost surface. However, this antifouling layer is provided only for the purpose of preventing contamination of the surface and there is no description of the relation with the suppression of deterioration of silver. Further, actually, even in a case where an antifouling layer is provided, it is not necessarily directly related to the suppression of deterioration of silver.

In JP2004-334012A, as described above, a constitution having a silicon nitride film for preventing oxidation of the silver layer is disclosed. However, since silicon nitride has a high refractive index, in a case where the silicon nitride is provided with such a thickness as to be able to suppress the deterioration of silver, the antireflection performance may be deteriorated.

The present invention is made in consideration of the above circumstances, and an object thereof is to provide an antireflection film capable of maintaining antireflection performance and suppressing deterioration of silver, a method for producing the same, an optical element including an antireflection film, and an optical system including the optical element.

According to the present invention, there is provided an antireflection film that is provided on a substrate and is formed by laminating an interlayer, a silver-containing metal layer containing silver, and a dielectric layer in this order on the substrate, in which the interlayer is a multilayer film having two or more layers, in which a layer of high refractive index having a relatively high refractive index and a layer of low refractive index having a relatively low refractive index are alternately laminated, and the dielectric layer has a surface to be exposed to air and is a multilayer film having two or more layers including an oxide layer and a fluorocarbon layer which is a self-assembled film that is formed by a silane coupling reaction to the oxide layer.

Here, the expression "containing silver" indicates that the content of silver included in the silver-containing metal layer is 50 atomic % or more.

In addition, the expressions "having a relatively high refractive index" and "having a relatively low refractive index" refer to the relationship between the layer of high refractive index and the layer of low refractive index, and means that the refractive index of the layer of high refractive index is higher than the refractive index of the layer of low refractive index and the refractive index of the layer of low refractive index is lower than the refractive index of the layer of high refractive index.

The expression "the interlayer is a multilayer film having two or more layers~" means that the interlayer includes at least one layer of high refractive index and one layer of low refractive index.

The expression "the dielectric layer is~a multilayer film having two or more layers~" means that the dielectric layer includes at least two layers of an oxide layer and a fluorocarbon layer.

Here, the expression "the fluorocarbon layer which is a self-assembled film that is formed by a silane coupling reaction to the oxide layer" is a monomolecular film that is formed in a self-assembled manner by a silane coupling reaction of a silane coupling agent having a fluorocarbon group with the oxide layer.

In the antireflection film of the present invention, it is preferable that the dielectric layer includes a silicon oxide layer.

In addition, the oxide layer which is a layer just below the fluorocarbon layer may be a silicon oxide layer.

In the antireflection film of the present invention, it is preferable that the dielectric layer includes a layer having a refractive index lower than a refractive index of the silicon oxide layer.

The layer having a refractive index lower than the refractive index of the silicon oxide layer is preferably a magnesium fluoride layer.

In the antireflection film of the present invention, it is preferable that the magnesium fluoride layer is arranged closer to the silver-containing metal layer than the silicon oxide layer.

In the antireflection film of the present invention, it is preferable that the surface to be exposed to air of the dielectric layer is formed of a fluorocarbon layer.

In the antireflection film of the present invention, it is preferable that a thickness of the fluorocarbon layer is 20 nm or less.

In the antireflection film of the present invention, it is preferable that a thickness of the silver-containing metal layer is 6 nm or less.

It is preferable that the antireflection film of the present invention further comprises an anchor layer provided between the silver-containing metal layer and the interlayer.

It is preferable that the antireflection film of the present invention further comprises an anchor region including an oxide of an anchor metal provided between the silver-containing metal layer and the interlayer; and a cap region including an oxide of the anchor metal provided between the silver-containing metal layer and the dielectric layer.

According to the present invention, there is provided a method for producing an antireflection film comprising: sequentially laminating the interlayer and the silver-containing metal layer on one surface of the substrate by a vapor phase growth method; and laminating the oxide layer on the silver-containing metal layer by a vapor phase growth method, and then immersing at least a surface of the oxide layer in a solution including a silane coupling agent having a fluorocarbon group to form the fluorocarbon layer by self-organization through a silane coupling reaction to the surface of the oxide layer.

According to the present invention, there is provided an optical element comprising the antireflection film according to the present invention.

According to the present invention, there is provided an optical system comprising: a group lens which includes the optical element according to the present invention and in which a surface of the optical element having the antireflection film provided thereon is arranged on outermost surfaces.

Here, the expression "outermost surfaces" refers to one side surfaces of lenses arranged at both ends of the group lens consisting of a plurality of lenses and refers to surfaces which become both end surfaces of the group lens.

The antireflection film of the present invention is an antireflection film that is provided on a substrate and is formed by laminating an interlayer, a silver-containing metal layer containing silver, and a dielectric layer, in this order, on the substrate, the interlayer is a multilayer film having two or more layers, in which a layer of high refractive index having a relatively high refractive index and a layer of low refractive index having a relatively low refractive index are alternately laminated, and the dielectric layer has a surface to be exposed to air and is a multilayer film having two or more layers including an oxide layer and a fluorocarbon layer which is a self-assembled film that is formed by a silane coupling reaction to the oxide layer. By providing the fluorocarbon layer which is a self-assembled film in the dielectric layer, it is possible to maintain antireflection performance and suppress deterioration of silver.

Since the antireflection film according to the present invention does not have an uneven structure or a porous structure, the antireflection film has high mechanical strength and is applicable to a surface of an optical member which is touched by a hand of a user.

DESCRIPTION OF THE PREFERRED EMBODIMENTS

Hereinafter, embodiments of the present invention will be described.

Figure 1:
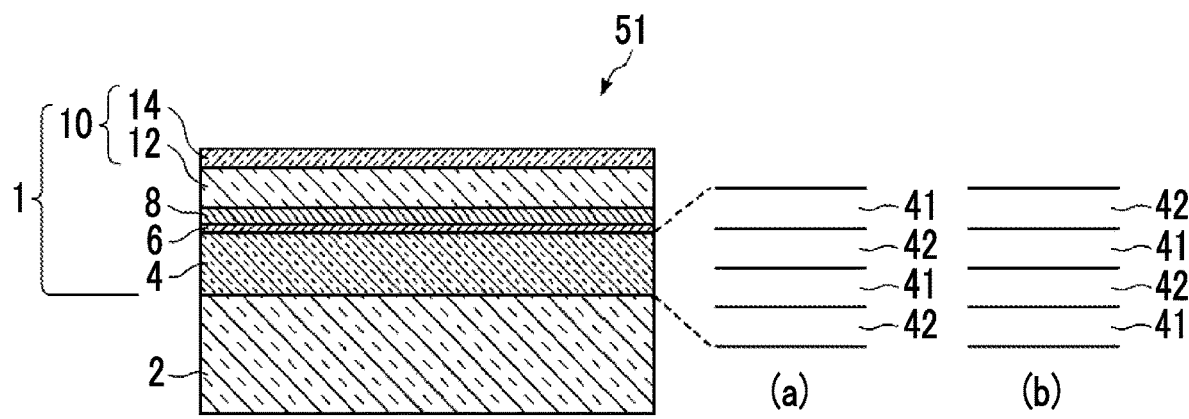
FIG. 1 is a schematic cross-sectional view showing an optical element including an antireflection film according to a first embodiment of the present invention.

FIG. 1 is a schematic cross-sectional view showing a schematic constitution of an optical element 51 including an antireflection film 1 according to a first embodiment of the present invention. As shown in FIG. 1, the antireflection film 1 of the embodiment is formed by laminating an interlayer 4, an anchor layer 6, a silver-containing metal layer 8 containing silver (Ag), and a dielectric layer 10 on a substrate 2 in this order. The interlayer 4 is a multilayer film having two or more layers, in which a layer of high refractive index 41 having a relatively high refractive index and a layer of low refractive index 42 having a relatively low refractive index are alternately laminated. In addition, the dielectric layer 10 is a multilayer film having two or more layers, which has a surface to be exposed to air and includes a silicon oxide layer 12, which is a form of oxide layer, and a fluorocarbon layer 14 which is a self-assembled film formed by a silane coupling reaction with respect to the silicon oxide layer 12 from the silver-containing metal layer 8 in this order. The optical element 51 includes the substrate 2 and the antireflection film 1 that is formed on a surface thereof.

In the antireflection film according to the embodiment of the present invention, light to be reflected varies depending on the purpose and is generally light in a visible light region. As required, light in an infrared region may be used.

The shape of the substrate 2 is not particularly limited and the substrate is a transparent optical member (transparent substrate) that is mainly used in an optical device such as a flat plate, a concave lens, or a convex lens and may also be a substrate constituted by a combination of a curved surface having a positive or negative curvature and a flat surface. As the material for the substrate 2, glass, plastic, and the like can be used. Here, the term "transparent" means being transparent (having an internal transmittance of 10% or more) to a wavelength of light of which reflection is to be suppressed (reflection prevention target light) in the optical member.

The refractive index of the substrate 2 is not particularly limited and is preferably 1.45 or more. The refractive index of the substrate 2 may be 1.61 or more and 1.74 or more and further 1.84 or more. For example, the substrate 2 may be a high power lens such as a first lens of a group lens of a camera or the like. In the present specification, all the refractive indices are refractive indices with respect to light having a wavelength of 500 nm.

The interlayer 4 is a multilayer film in which the layer of high refractive index 41 and the layer of low refractive index 42 are alternately laminated, and may include at least one layer of high refractive index 41 and at least one layer of low refractive index 42. In the embodiment, total four layers of the layer of high refractive index 41 and the layer of low refractive index 42 are alternately laminated. At this time, as shown in (a) of FIG. 1, the layer of low refractive index 42 and the layer of high refractive index 41 may be laminated from the substrate 2 in this order or as shown in (b) of FIG. 1, the layer of high refractive index 41 and the layer of low refractive index 42 may be laminated from the substrate 2 in this order. Although the number of the interlayers 4 is not limited, the number of the interlayers is preferably 16 layers or less from the viewpoint of cost suppression.

The refractive index of the layer of high refractive index 41 may be higher than the refractive index of the layer of low refractive index 42 and the refractive index of the layer of low refractive index 42 may be lower than the refractive index of the layer of high refractive index 41. However, it is more preferable that the refractive index of the layer of high refractive index 41 is higher than the refractive index of the substrate 2 and the refractive index of the layer of low refractive index 42 is lower than the refractive index of the substrate 2.

The layers of high refractive index 41 or the layers of low refractive index 42 may not have the same refractive index and a case where the refractive index layers are formed of the same material and have the same refractive index is preferable from the viewpoint of suppressing material cost, film formation cost and the like.

Examples of the material for forming the layer of low refractive index 42 include silicon oxide ($SiO_2$), silicon oxynitride (SiON), gallium oxide ($Ga_2O_3$), aluminum oxide ($Al_2O_3$), lanthanum oxide ($La_2O_3$), lanthanum fluoride ($LaF_3$), magnesium fluoride ($MgF_2$), and sodium aluminum fluoride ($Na_3AlF_6$).

Examples of the material for forming the layer of high refractive index 41 include niobium pentoxide ($Nb_2O_5$), titanium oxide ($TiO_2$), zirconium oxide ($ZrO_2$), tantalum pentoxide ($Ta_2O_5$), silicon oxynitride (SiON), silicon nitride ($Si_3N_4$), silicon niobium oxide (SiNbO), and Substance H4 (manufactured by Merck Group).

The refractive index can be changed to some extent by controlling any of these compounds to have the constitutional element ratio which is shifted from the compositional ratio of the stoichiometric ratio or by forming a film by controlling the film formation density. The materials constituting the layer of low refractive index and the layer of high refractive index are not limited to the above compounds as long as the materials satisfy the above-mentioned refractive index condition. In addition, unavoidable impurities may be included.

Each layer of the interlayer 4 is preferably formed by using a vapor phase growth method such as vacuum deposition, plasma sputtering, electron cyclotron sputtering, or ion plating. According to the vapor phase growth method, a laminated structure having various refractive indices and layer thicknesses can be easily formed.

The silver-containing metal layer 8 is a layer formed of 50 atomic % or more of silver with respect to the constitutional elements. The layer may contain at least one of palladium (Pd), copper (Cu), gold (Au), neodymium (Nd), samarium (Sm), bismuth (Bi), platinum (Pt), tin (Sn), aluminum (Al), zinc (Zn), magnesium (Mg), indium (In), gallium (Ga), or lead (Pb), in addition to silver. Specifically, for example, as the material constituting the silver-containing metal layer 8, an Ag—Nd—Cu alloy, an Ag—Pd—Cu alloy, an Ag—Bi—Nd alloy, or the like may be suitably used. The thickness of the silver-containing metal layer 8 is preferably set to 6 nm or less.

As the raw material for forming the silver-containing metal layer 8, a material in which 85 atomic % or more of the constitutional elements is silver is preferably used. In this case, the content of metal elements other than silver may be less than 15 atomic %, but is more preferably 5 atomic % or less and even more preferably 2 atomic % or less. The content of this case refers to a total content of two or more metal elements in a case in which the metal layer contains two or more metal elements other than silver. From the viewpoint of preventing reflection, it is preferable that the compositional ratio of silver is high. The ratio of silver is preferably 80 atomic % or more and more preferably 90 atomic % or more, and pure silver is most preferable. On the other hand, from the viewpoint of flatness and durability of the silver-containing metal layer 8, the silver-containing metal layer 8 preferably contains metal elements other than silver. The metal compositional ratio in the silver-containing metal layer 8 may not be uniform.

The film thickness of the silver-containing metal layer 8 is preferably 6 nm or less and is preferably 0.5 nm or more. Further, the film thickness of the silver-containing metal layer is preferably 2.0 nm or more, more preferably 2.5 nm or more, and particularly preferably 3 nm or more. The film thickness used herein refers to the film thickness of the silver-containing metal layer 8 in the antireflection film after production, and can be confirmed by the film thickness and the composition obtained from cross-sectional TEM-EDX (transmission electron microscope (TEM)-energy dispersive X-ray spectroscopy (EDX)) analysis. In a case where metal migration occurs between upper and lower layers and a mixed layer is formed, a range in which an Ag composition is highest is defined as a film thickness of Ag and the film thickness is measured. Since the silver-containing metal layer 8 is a film which is formed to be very thin, actually, discontinuous regions or missing regions may be formed in some cases. In addition, the film formation surface is not perfectly smooth surface and is typically a surface having granular unevenness.

In the formation of the silver-containing metal layer 8, a vapor phase growth method such as vacuum deposition, plasma sputtering, electron cyclotron sputtering, or ion plating is preferably used.

In the embodiment, the dielectric layer 10 is constituted of the silicon oxide ($SiO_2$) layer 12 and the fluorocarbon layer 14 which is provided as a self-assembled film on the silicon oxide layer 12. In the antireflection film according to the embodiment of the present invention, a plurality of layers may be provided in the dielectric layer other than these two layers. In addition, the refractive index of each layer constituting the dielectric layer is preferably 1.35 or more and 1.51 or less. However, the dielectric layer may be provided with a very thin layer having a high refractive index (for example, less than 1 nm). Examples of the material constituting the dielectric layer include SiON, $MgF_2$, and $Na_3AlF_6$, in addition to $SiO_2$. Particularly preferable is $SiO_2$ or $MgF_2$. The refractive index can be changed to some extent by controlling any of these compounds to have the constitutional element ratio which is shifted from the compositional ratio of the stoichiometric ratio or by forming a film by controlling the film formation density.

The thickness (total thickness) of the dielectric layer is preferably about $\lambda/4n$ in a case in which a target wavelength is $\lambda$ and the refractive index of the dielectric layer is n. Specifically, the thickness of the dielectric layer is about 70 nm to 100 nm.

The fluorocarbon layer 14 is formed as a self-assembled film by a silane coupling reaction of a silane coupling agent having a fluorocarbon group on the surface of the oxide layer (herein, silicon oxide layer), which is the layer just below, using a silane coupling agent having a fluorocarbon group. Therefore, for silane coupling, it is necessary that the layer just below the fluorocarbon layer 14 is an oxide layer and particularly, as shown in the embodiment, a silicon oxide layer is preferable. However, another metal oxide layer may be provided. At this time, separately from the oxide layer just below the fluorocarbon layer, a silicon oxide layer may be provided. In addition, even in a constitution in which another material is arranged in an island shape on the surface of the oxide layer, as long as there is a region where the oxide layer is exposed on the laminated surface, it is possible to form a self-assembled film by silane coupling. The thickness of the fluorocarbon layer is preferably 20 nm or less. In the case of a monomolecular film, the thickness is about 20 nm or less.

Fluorocarbon is strongly hydrophobic and has a great effect of suppressing entry of hydrophilic molecules such as moisture and halogen ions such as chlorine. High protective performance can be realized by providing the fluorocarbon layer as a dense self-assembled film as in the constitution of the present invention. In addition, the self-assembled film can be formed as a uniform film, which is preferable as an optical application.

As a method for preparing the fluorocarbon layer, vacuum deposition, solution process (coating method) and the like are available. According to the solution process, a film with fewer defects can be formed and thus the solution process is preferable. Examples of the solution process include dip coating and spin coating.

Specific examples of the silane coupling agent having a fluorocarbon group include SurfClear 100 manufactured by Canon Optron Inc., OPTOOL HD series manufactured by Daikin Industries, Ltd., Novec 1720 manufactured by Sumitomo 3M Limited; and some (causing a silane coupling reaction) of fluoro coatings manufactured by FluoroTechnology Co., LTD.

Whether or not the fluorocarbon layer as a self-assembled film formed by a silane coupling reaction is present can be confirmed by the film thickness and the composition obtained from cross-sectional TEM-EDX (transmission electron microscope (TEM)-energy dispersive X-ray spectroscopy (EDX)) analysis.

In the antireflection film 1 of the embodiment, as shown in FIG. 1, the anchor layer 6 is provided between the interlayer 4 and the silver-containing metal layer 8. As the concentration of silver increases, the silver-containing metal layer 8 grows in a granular form rather than a smooth film in some cases. Granulation is suppressed by forming a film containing silver on the anchor layer after forming the anchor layer 6, and thus a thin film with high smoothness can be formed. As described above, a metal layer containing a metal element other than silver has high smoothness compared to a film formed using pure silver and higher smoothness can be obtained by forming, such a metal layer on the anchor layer. Specifically, the material constituting the anchor layer include titanium (Ti), chromium (Cr), niobium (Nb), molybdenum (Mo), bismuth (Bi), lead (Pb), tin (Sn), indium (In), magnesium (Mg), zinc (Zn), gallium (Ga), germanium (Ge), and silicon (Si). Among these, bismuth (Bi), lead (Pb), tin (Sn), indium (In), magnesium (Mg), zinc (Zn), gallium (Ga), germanium (Ge), and silicon (Si) are preferable, and Pb, Sn, In, Mg, Zn, Ga, and Ge are more preferable. According to the investigation of the present inventors, In, Ga, and Ge are even more preferable and Ge is particularly preferable from the viewpoint of suppressing an increase in the particle size of Ag.

The thickness of the anchor layer is not particularly limited and is particularly preferably 0.2 nm to 2 nm. In a case where the thickness of the anchor layer is set to 0.2 nm or more, it is possible to sufficiently suppress the granulation of the metal layer formed thereon. In a case where the thickness of the anchor layer is set to 2 nm or less, absorption of an incident ray by the anchor layer itself can be suppressed and thus a decrease in the transmittance of the antireflection film can be suppressed. The anchor metal may contain not a single metal but two or more kinds of metals. In this case, at the time of formation of the anchor layer, the anchor layer may be formed as an alloy layer formed of two or more kinds of metals and at the time of formation of the anchor layer, a plurality of layers formed of a single metal may be laminated.

In some cases, the anchor layer 6 may be altered into an interface region between the silver-containing metal layer and the interlayer, and an anchor region and a cap region in the an interface region between the silver-containing metal layer and the dielectric layer such that a part of the anchor metal constituting the anchor layer remains on a side of the silver-containing metal layer close to the interlayer, is made to partially pass through the silver-containing metal layer, and is moved to a side of the silver-containing metal layer close to the dielectric layer in the preparation process. In the anchor region and the cap region, a part or all of the anchor metal may be present in an oxidized state. Whether or not the anchor metal is moved varies depending on the anchor metal, and preparation conditions such as annealing temperature and the like. According to the investigation by the present inventors, among the metals mentioned as specific examples of the anchor metal, metals listed as preferable examples are relatively easily moved and alteration from the anchor layer to the anchor region and the cap region easily occurs.

In addition, a trade amount of anchor layer metal may remain in Ag.

Figure 2:
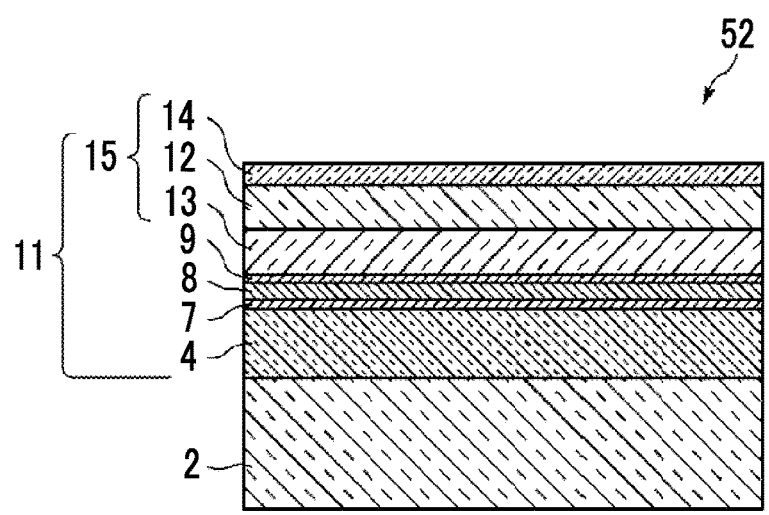
FIG. 2 is a schematic cross-sectional view showing an optical element including an antireflection film according to a second embodiment of the present invention.
Figure 3:
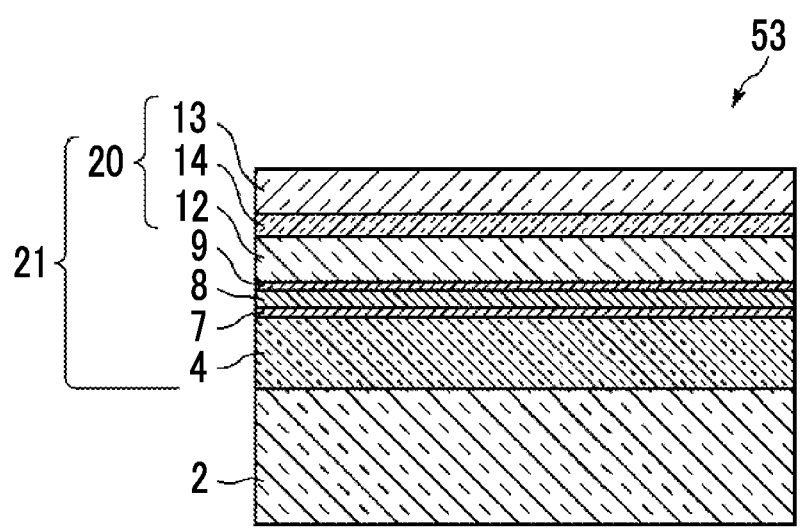
FIG. 3 is a schematic cross-sectional view showing an optical element including an antireflection film according to a third embodiment of the present invention.

FIGS. 2 and 3 are schematic cross-sectional views respectively showing an optical element 52 including an antireflection film 11 according to a second embodiment and an optical element 53 including an antireflection film 21 according to a third embodiment. In each drawing, the constitutional elements equivalent to the constitutional elements in the optical element 51 including the antireflection film 1 according to the first embodiment are denoted by the same reference numerals, and a detailed description thereof will be omitted.

The antireflection film 11 according to the second embodiment shown in FIG. 2 is different from the antireflection film 1 according to the first embodiment in that the antireflection film according to the second embodiment includes an anchor region 7 on the side of the silver-containing metal layer 8 close to the interlayer 4 and a cap region 9 on the side close to a dielectric layer 15, and as the dielectric layer 15, a magnesium fluoride layer 13 is provided below a silicon oxide layer 12.

The anchor region 7 is a region formed by alteration of the anchor layer which is provided to smoothly form the silver-containing metal layer after the interlayer 4 is laminated and before the silver-containing metal layer 8 is laminated in the process of producing the anchor layer in the antireflection film according to the first embodiment, and is an interface region between the interlayer 4 and the silver-containing metal layer 8.

Similarly, the cap region 9 is an interface region between the silver-containing metal layer 8 and the dielectric layer 15 including an oxide of the anchor metal obtained in such a manner that the anchor metal constituting the anchor layer is made to pass through the silver-containing metal layer 8 and is oxidized by oxygen under an environment on the surface of the silver-containing metal layer 8 in the production process.

Here, the alteration means that the interlayer mixing with the constitutional elements of the interlayer and the silver-containing metal layer or oxidation of the metal element or the like occurs, and the state of the anchor layer is different from the state of the anchor layer at the time of film formation.

After the anchor layer 6 is altered to the anchor region 7 and the cap region 9, there is a case where the total film thickness of both regions 7 and 9 is increased with the oxidation of the anchor metal by about two times compared to the film thickness of the anchor layer 6.

Accordingly, the atoms present in the silver-containing metal layer 8 and the interlayer 4 are mixed in the anchor region 7 in addition to the anchor metal and the oxide thereof, and the atoms present in the silver-containing metal layer 8 and the dielectric layer 15 are mixed in the cap region 9 in addition to the anchor oxide. The anchor region 7 and the cap region 9 are regions in which when the content of the anchor metal is measured in the depth direction (lamination direction), the content is about 2 nm or less around a position showing the peak (the position in the depth direction) in a line profile showing a change in the content at the position in the depth direction. In the line profile, two peaks are observed. Of the two peaks, one closer to the substrate is the peak of the anchor region and the other far from the substrate is the peak of the cap region. The anchor metal content peak position can be calculated from the line profile of, for example, TEM-EDX. In the line profile, the point where the signal of the anchor metal is strong (maximum value) is calculated as the peak position.

There is a case where an oxidized anchor metal (anchor metal oxide) and an anchor metal which is not oxidized are mixed in the anchor region. However, it is desirable that the content of the anchor metal oxide is larger than the content of the anchor metal which is not oxidized, and it is particularly preferable that all the anchor metal included in the anchor region is oxidized.

On the other hand, it is preferable that the anchor metal included in the cap region is fully oxidized to form an anchor metal oxide.

The cap region is considered to have an effect of preventing silver from aggregating and growing into a granular form at the time of annealing. In the production process, in a stage in which the anchor layer and the silver-containing metal layer are sequentially formed, the anchor metal is moved and in this stage, oxidation of the anchor metal moved to the surface occurs by exposure to the atmospheric air. It is considered that the anchor metal becomes stable as the anchor metal becomes an oxide, and cap performance such as silver migration suppression, aggregation suppression, long-term stability, water resistance and moisture resistance is improved. The most part of the anchor metal of the cap region is oxidized by annealing in the presence of oxygen. At this time, it is preferable that 80% or more of the anchor metal included in the cap region is oxidized and it is more preferable that all the anchor metal in the cap region is oxidized to form an anchor metal oxide.

By providing the anchor region and the cap region as described above, an ultrathin silver film structure achieving both high flatness and high transparency can be realized.

In addition, the magnesium fluoride layer 13 is provided below the silicon oxide layer 12 in the dielectric layer IS in the embodiment. The antireflection function can be further improved by further providing the magnesium fluoride layer 13.

In a dielectric layer 20 of the antireflection film 21 according to the third embodiment shown in FIG. 3, the magnesium fluoride layer 13 is provided above the fluorocarbon layer 14. In a case where in the dielectric layer of the antireflection film according to the embodiment of the present invention, the silicon oxide layer and the fluorocarbon layer as a self-assembled film are provided in this manner, another layer may be provided below the silicon oxide layer or another layer may be provided above the fluorocarbon layer. Here, in a case where the magnesium fluoride layer is a surface to be exposed to air, the durability is lowered and thus it is most preferable to provide a fluorocarbon layer on the outermost surface.

In the embodiment, the magnesium fluoride layer is used but a dielectric film formed of another material may be used.

In a case where another layer is provided in the dielectric layer in addition to the silicon oxide layer and the fluorocarbon layer, antireflection properties can be improved by combination with a material having a refractive index lower than the refractive index of the silicon oxide layer.

The antireflection film according to the embodiment of the present invention may include other functional layers such as a protective layer having a function of protection for suppressing oxidation of the silver-containing metal layer, in addition to the above-described respective layers. In addition, in the film formation of each layer constituting the antireflection film according to the embodiment of the present invention, in a case where an ultrathin layer of nm order is formed, it is difficult to form a uniform film, and in reality, an uneven film is formed or parts (sea) not partially formed into a sea-island state are formed. However, the present invention includes such forms.

Figure 4:
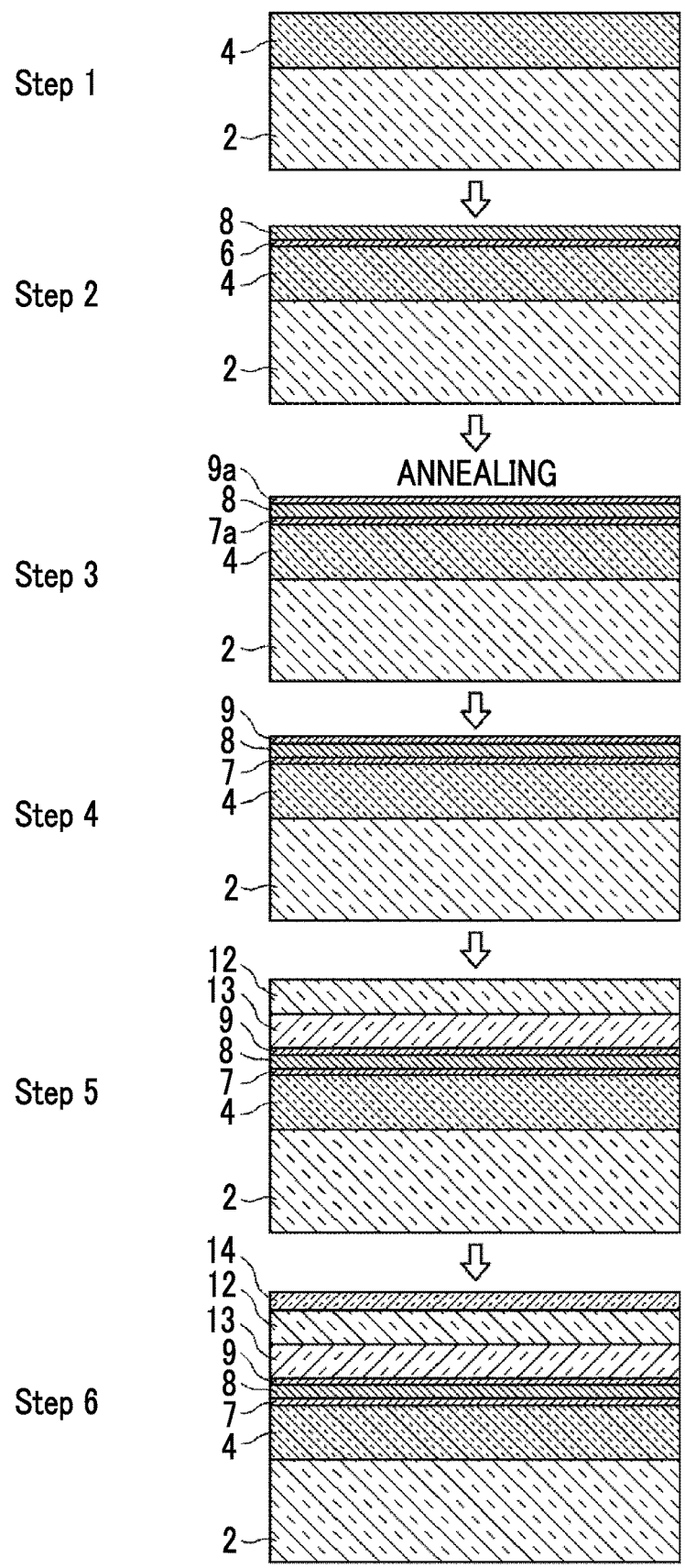
FIG. 4 is a production step diagram of the antireflection film according to the second embodiment.

As an embodiment of a method for producing an antireflection film according to the present invention, a method for producing the antireflection film 11 according to the second embodiment shown in FIG. 2 will be described as an example. FIG. 4 is diagram showing a production step.

The interlayer 4 is formed on the substrate 2 (Step 1), then a metal in a metal oxide included in the anchor region and the cap region is formed into a layer as the anchor layer 6, and further, the silver-containing metal layer 8 is formed (Step 2). The anchor layer 6 and the silver-containing metal layer 8 are formed in the atmosphere in which oxygen does not exist. The film thickness of the anchor layer 6 is preferably about 0.2 nm to 2.0 nm. Since a part of the anchor metal constituting the anchor layer 6 is moved to the surface of the silver-containing metal layer 8 in the production process in the antireflection film as already described above, the anchor layer is altered into the anchor region and the thickness is greatly changed. The movement (diffusion) of the anchor metal starts to occur immediately after the silver-containing metal layer 8 is formed.

Thereafter, the substrate 2 in which the interlayer 4, the anchor layer 6, and the silver-containing metal layer 8 are laminated in order is exposed to the atmospheric air and annealing is performed in the atmospheric air (Step 3). The annealing temperature is preferably 100° C. to 400° C. and the annealing time is preferably about 1 minute to 2 hours. When the annealing is started, the anchor metal in the anchor layer 6 is already moved through the silver-containing metal layer 8 and a precursor region 9a of the cap region is being formed on the surface of the silver-containing metal layer 8. On the other hand, the anchor layer 6 becomes a region 7a in the middle of alteration into the anchor region.

In the anchor metal which has started to move after the film formation, the anchor metal moved to the surface of the silver-containing metal layer 8 starts to be oxidized in a stage in which the substrate 2 is exposed to the atmospheric air. Then, the diffusion or oxidation of the anchor metal is promoted by annealing and after the annealing treatment, the anchor layer 6 is altered into the anchor region 7, the anchor metal passes through the silver-containing metal layer 8 and is moved to the surface of the laminate, and the moved anchor metal is oxidized to form a metal oxide. Thus, the cap region 9 formed of the metal oxide is formed (Step 4).

Thereafter, the magnesium fluoride layer 13 and the silicon oxide layer 12 are formed in the dielectric layer formed on the cap region 9 which is the outermost surface of the laminate (Step 5).

Further, the surface of the silicon oxide layer 12 is immersed in a solution including a silane coupling agent having a fluorocarbon group to form a fluorocarbon layer 14 which is a self-assembled film by a silane coupling reaction (Step 6). The silane coupling agent may be formed by vacuum deposition.

Through the above steps, the antireflection film 11 of the embodiment shown in FIG. 2 can be prepared.

The antireflection film according to the embodiment of the present invention can be applied to the surface of various optical members. Since the antireflection film can be applied to a lens surface having a high refractive index, for example, the antireflection film is suitably used for the outermost surface of a known zoom lens described in JP2011-186417A.

An embodiment of an optical system constituted by a group lens including the antireflection film 1 of the above-described first embodiment will be described.

Figure 5:
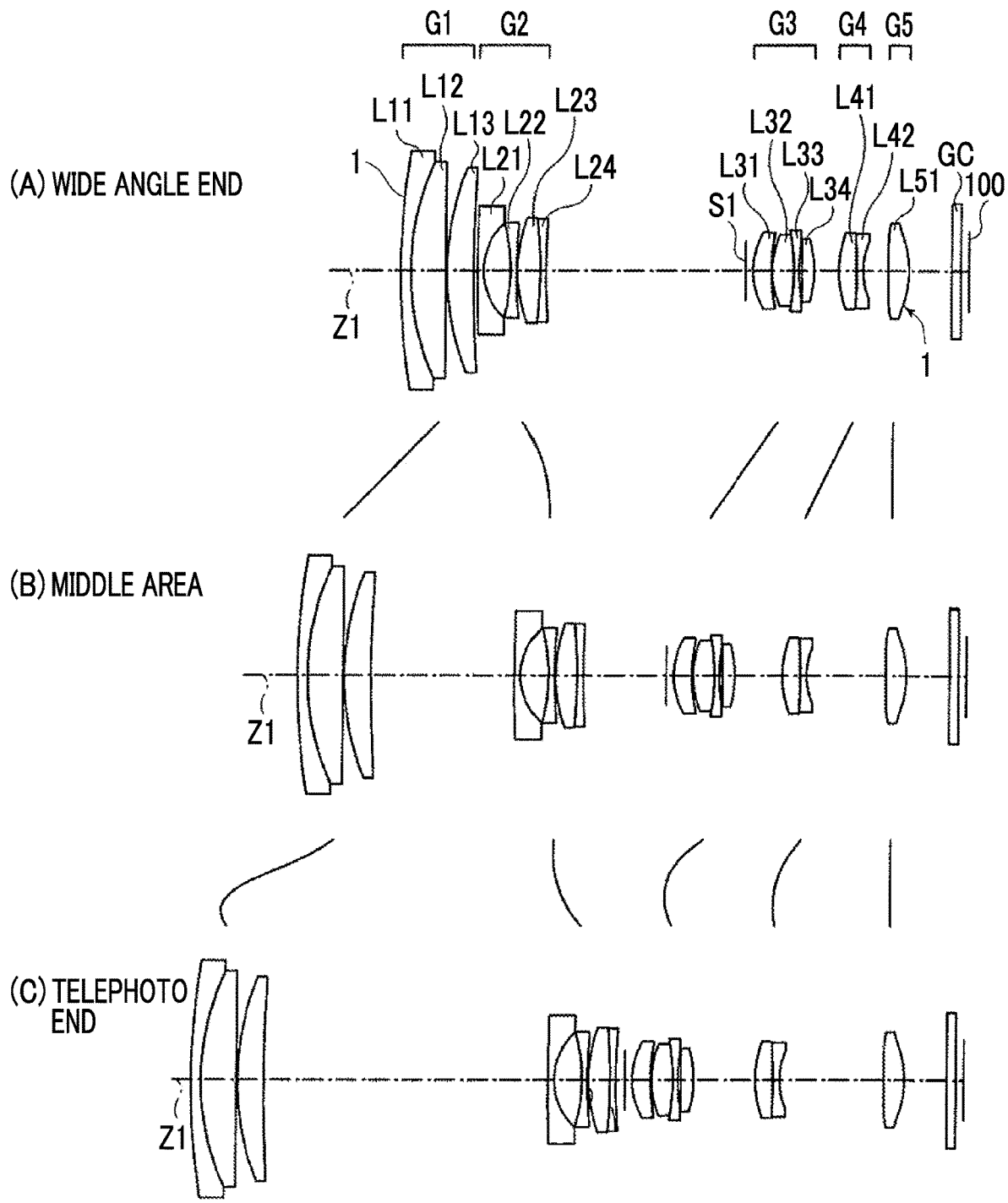
FIG. 5 is a view showing a constitution of an optical system consisting of a group lens including the optical element of the present invention.

(A), (B), and (C) of FIG. 5 show constitution examples of a zoom lens which is an embodiment of the optical system according to the embodiment of the present invention. (A) of FIG. 5 corresponds to an optical system arrangement at a wide angle end (shortest focal length state), (B) of FIG. 5 corresponds to an optical system arrangement in a middle area (intermediate focal length state), and (C) of FIG. 5 corresponds to an optical system arrangement at a telephoto end (longest focal length state).

The zoom lens includes a first lens group G1, a second lens group G2, a third lens group G3, a fourth lens group G4, and a fifth lens group G5 in order from an object along an optical axis Z1. An optical aperture stop SI is preferably arranged between the second lens group G2 and the third lens group G3 in the vicinity of the third lens group G3 on the side close to the object. Each of the lens groups G1 to G5 includes one or a plurality of lenses Lij. The reference symbol Lij denotes a j-th lens with the reference symbol affixed such that a lens arranged to be closest to the object in an i-th lens group is made into the first side and the reference symbol is gradually increased toward an image forming side.

The zoom lens can be mounted in an information portable terminal as well as imaging devices, for example, a video camera, and a digital still camera. On the imaging side of the zoom lens, members are arranged according to the constitution of an imaging portion of a camera in which the lens is to be mounted. For example, an imaging element 100 such as a charge coupled device (CCD) or a complementary metal oxide semiconductor (CMOS) is arranged on an image forming surface (imaging surface) of the zoom lens. Various optical members GC may be arranged between the final lens group (fifth lens group G5) and the imaging element 100 according to the constitution of the camera side in which the lens is mounted.

The zoom lens is configured such that the magnification is changed by chaining the gaps between the individual groups by moving at least the first lens group G1, the third lens group G3, and the fourth lens group G4 along the optical axis Z1. In addition, the fourth lens group G4 may be moved at focusing. It is preferable that the fifth lens group G5 is always fixed in magnification change and at focusing. The aperture stop SI is moved together with the third lens group G3, for example. More specifically, as the magnification changes from the wide angle end to the middle area and further to the telephoto end, each lens group and the aperture stop S1 is moved, for example, from the state of (A) of FIG. 5 to the state of (B) of FIG. 5 and further to the state of (C) of FIG. 5 along the locus indicated the solid line in the drawing.

The antireflection film 1 is provided on the outermost surfaces of the zoom lens of the outer surface (the surface close to the object) of a lens L11 of the first lens group G1 and a lens L51 of the fifth lens group G5 which is the final lens group. The antireflection film 1 may be provided other lens surfaces in the same manner.

Since the antireflection film 1 of the embodiment has high mechanical strength, the antireflection film can be provided on the outermost surface of the zoom lens which may be touched by a user and thus a zoom lens having very high antireflection performance can be formed.

In addition, in the antireflection film having a fine uneven structure, fluctuations in the refractive index are present in addition to the uneven structure and thus there is a concern of scattering occurring due to the fluctuations in the refractive index. However, since almost no fluctuations the in refractive index are present in the antireflection film according to the embodiment of the present invention having an uneven structure, scattering hardly occurs. In the antireflection film in a camera lens, scattering causes the occurrence of flare and thus a contrast in an image is lowered. Thus, scattering is suppressed by providing the antireflection film according to the embodiment of the present invention, and as a result, it is possible to prevent a contrast in an image from being lowered.

EXAMPLES

Examples of the specific layer structure contributing to antireflection performance in the antireflection film according to the embodiment of the present invention will be described.

In Table 1 below, the layer structure, the film thickness obtained by optimizing the film thickness using Essential Macleod (manufactured by Thin Film Center Inc.), and the average value of the reflectivity (average reflectivity) at visible light (at a wavelength of 400 nm to 700 nm) obtained from the simulation of the wavelength dependence of the reflectivity of each of Examples and Comparative Examples are shown. Table 1 also shows the durability test results described later.

In the simulation, S-NBH 5 (manufactured by OHARA INC.: refractive index: 1.66393) was assumed as a substrate, the interlayer had a structure in which total four layers of $SiO_2$ (refractive index: 1.46235) as a layer of low refractive index and $TiO_2$ (refractive index: 2.291) as a layer of high refractive index were alternately laminated, a dielectric layer on an Ag layer (refractive index: 0.05) had a structure shown in Table 1, and the film thickness was optimized so that the reflectivity was the lowest. The refractive index of $MgF_2$ was set to 1.3857, the refractive index of SurfClear 100, OPTOOL HD 1100, and FLUORO SURF FG-5040, that is, a fluorocarbon layer was set to 1.33, the film thickness of the fluorocarbon layer was fixed to 16 nm as a film thickness of a monomolecular film, and then the simulation was performed. However, in Example 8, further, the Ag film thickness was set to 6 nm and then the film thicknesses of other layers were optimized.

TABLE 1

| | | Interlayer | | | | Ag-containing metal layer | Dielectric layer | | |
| | | | | | | | First dielectric layer | | Second dielectric layer |
| | Substrate | $SiO_2$ | $TiO_2$ | $SiO_2$ | $TiO_2$ | | Material | Film thickness | Material |
|---|---|---|---|---|---|---|---|---|---|
| Example 1 | S-NBH5 | 49.61 | 7.28 | 65.39 | 21.34 | 5.37 | $SiO_2$ | 66.65 | SurfClear |
| Example 2 | S-NBH5 | 49.49 | 6.91 | 67.9 | 20.58 | 5.13 | $MgF_2$ | 21.33 | $SiO_2$ |
| Example 3 | S-NBH5 | 53.15 | 5.24 | 75.66 | 18.67 | 5.04 | $MgF_2$ | 36.33 | $SiO_2$ |
| Example 4 | S-NBH5 | 54.52 | 3.48 | 86.86 | 16.41 | 4.9 | $MgF_2$ | 52.14 | $SiO_2$ |
| Example 5 | S-NBH5 | 53.07 | 2.8 | 93.65 | 15.24 | 4.79 | $MgF_2$ | 63.45 | $SiO_2$ |
| Example 6 | S-NBH5 | 46.35 | 7.89 | 63.74 | 18.44 | 4.53 | $SiO_2$ | 30 | SurfClear |
| Example 7 | S-NBH5 | 53.15 | 5.24 | 75.66 | 18.67 | 5.04 | $MgF_2$ | 36.33 | $SiO_2$ |
| Example 8 | S-NBH5 | 46.11 | 1.36 | 109.16 | 17.54 | 6 | $SiO_2$ | 64.12 | SurfClear |
| Comparative Example 1 | S-NBH5 | 41.73 | 8.63 | 61.83 | 18.59 | 4.16 | $MgF_2$ | 85.34 | — |
| Comparative Example 2 | S-NBH5 | 48.37 | 7.61 | 64.35 | 21.9 | 5.42 | $SiO_2$ | 77.53 | — |
| Comparative Example 3 | S-NBH5 | 47.27 | 7.46 | 66.95 | 26.86 | 6.76 | $SiO_2$ | 41.2 | $Si_3N_4$ |
| Comparative Example 4 | S-NBH5 | 59.79 | 6.21 | 62.81 | 24.12 | 7.26 | $Si_3N_4$ | 16 | $SiO_2$ |
| Comparative Example 5 | S-NBH5 | 56.03 | 6.21 | 66.79 | 21.45 | 6.12 | $Si_3N_4$ | 6 | $SiO_2$ |
| Comparative Example 6 | S-NBH5 | 49.61 | 7.28 | 65.39 | 21.34 | 5.37 | $SiO_2$ | 66.65 | FLUOROSURF |

TABLE 1-continued

| | Dielectric layer | | | Average reflectivity % (400 to 800 nm) | Evaluation of reflection performance | Evaluation of durability |
|---|---|---|---|---|---|---|
| | Second dielectric layer | Third dielectric layer | | | | |
| | Film thickness | Material | Film thickness | | | |
| Example 1 | 16 | — | — | 0.051157 | C | B |
| Example 2 | 45 | SurfClear | 16 | 0.048350 | B | B |
| Example 3 | 30 | SurfClear | 16 | 0.041942 | B | B |
| Example 4 | 15 | SurfClear | 16 | 0.035479 | A | C |
| Example 5 | 5 | SutfClear | 16 | 0.031939 | A | C |
| Example 6 | 16 | $MgF_2$ | 40.15 | 0.032805 | A | C |
| Example 7 | 30 | OPTOOL | 16 | 0.041942 | B | A |
| Example 8 | 16 | — | — | 0.055202 | C | B |
| Comparative Example 1 | — | — | — | 0.034913 | A | E |
| Comparative Example 2 | — | — | — | 0.056205 | C | D |
| Comparative Example 3 | 16 | — | — | 0.160813 | E | C |
| Comparative Example 4 | 62.82 | — | — | 0.066279 | D | C |
| Comparative Example 5 | 72.2 | | | 0.055010 | C | D |
| Comparative Example 6 | 16 | | | 0.051157 | C | D |

<Evaluation of Reflection Performance>

The reflection performance was evaluated based on the average reflectivity as follows.

A: 0.04% or less
B: More than 0.04% and 0.05% or less
C: More than 0.05% and 0.06% or less
D: More than 0.06% and 0.10% or less
E: More than 0.10%

<Method for Preparing Sample for Durability Test>

Figure 6:
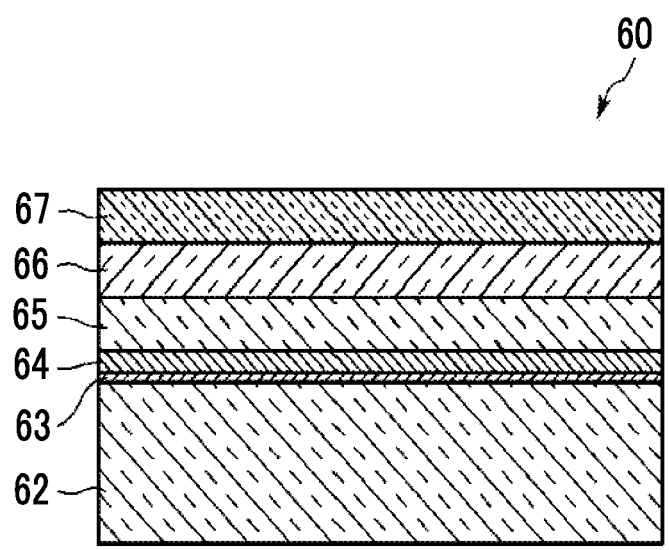
FIG. 6 is a cross-sectional view schematically showing a layer structure of a sample for durability test.

FIG. 6 shows a schematic cross-sectional view of the lamination constitution of a sample for durability test 60.

The sample 60 was prepared by laminating a 1 nm Ge layer 63 as an anchor layer and a 4 nm Ag layer 64 as a silver-containing metal layer and then sequentially laminating a first dielectric layer 65, a second dielectric layer 66, and a third dielectric layer 67 on a glass substrate 62. The constitution of the dielectric layer of each of Examples and Comparative Examples subjected to the reflectivity simulation in Table 1 was provided on the Ag layer 64 to form samples for durability test. Accordingly, there is Comparative Example in which the second and third dielectric layers are not provided or there are Examples in which the third dielectric layer is not provided.

The film thickness of each dielectric layer at the time of preparing each sample was set to the film thickness of which the decimal point of the numerical value in Table 1 was rounded down. For example, in the sample for durability test of Example 1, a 1 nm anchor layer, a 4 nm Ag layer, and a 66 nm $SiO_2$ layer as the first dielectric layer were formed on the glass substrate, and a fluorocarbon layer was formed on the surface thereof as a second dielectric layer using SurfClear 100 (a silane coupling agent having a fluorocarbon group, manufactured by Canon Optron Inc.). The film thickness of the fluorocarbon layer is the film thickness of the monomolecular film.

In the preparation of each sample, film formation of each layer was carried out by the following method.

The Ge layer, the Ag layer, the $MgF_2$ layer, and the $SiO_2$ layers were formed by electron beam (EB) vapor deposition using EBX-1000 manufactured by MAC Technologies, Inc. Each layer was formed by controlling the film thickness with a crystal oscillator.

In addition, a film of $Si_3N_4$ was formed by ECR sputtering using AFTEX-6000 manufactured by MES AFTY Corporation.

A film of SurfClear 100 was formed by a resistance heating method using EBX-1000 manufactured by ULVAC Technologies, Inc.

On the other hand, films of OPTOOL HD (a silane coupling agent having a fluorocarbon group, manufactured by Daikin Industries, Ltd.) and FLUORO SURF FG-5040 (having a fluorocarbon group but not a silane coupling agent, manufactured by FluoroTechnology Co., LTD.) were formed by an immersion method (solution method).

For the samples for durability test of Examples and Comparative Examples obtained as described above, the following durability test was conducted.

<Durability Test>

Each sample was immersed in a 5% by mass saline solution, and the abnormality occurrence time was visually observed to evaluate durability. Since silver turned yellow in a case where silver was oxidized by salt water, the time required for the sample to turn yellow was investigated and evaluated according to the following standards. The evaluation result is as shown in Table 1.

A: 5 hours or longer
B: 1 hour or longer and shorter than 5 hours
C: 30 minutes or longer and shorter than 1 hour
D: 5 minutes or longer and shorter than 30 minutes
E: Shorter than 5 minutes As shown in Table 1, Examples 1 to 8 of the present invention were practically preferable since evaluation results of both reflection performance and durability were C or higher. On the other hand, for Comparative Examples 1 to 6, the evaluation result of at least one of reflection performance or durability was D or lower.

The difference in layer structure between Example 1 and Comparative Example 2 is the presence or absence of the fluorocarbon layer on the surface. From comparison of both films, it is obvious that durability is improved by providing the fluorocarbon layer. The reflectivity also tended to be lowered in a case of the film provided with the fluorocarbon layer.

As shown in Examples 2 to 7 it was found that since the dielectric layer had a three-layer structure including a $MgF_2$ layer, a $SiO_2$ layer, and a fluorocarbon layer, compared to a two-layer structure including a $SiO_2$ layer and a fluorocarbon layer of Example 1, high reflection performance could be obtained. In particular, the effect of suppressing the reflectivity was high in a case where the $MgF_2$ layer was made thick and the $SiO_2$ layer was made thin, and the durability was high in a case where the $MgF_2$ layer was made thin and the $SiO_2$ layer was made thick.

Therefore, it is preferable that in a case where durability is desired to be increased even a little bit (durability is preferentially considered) depending on the application, the $SiO_2$ layer is made thick and in a case where reflection properties are preferentially considered, the film thickness of the $MgF_2$ layer is increased.

In addition, the protective film of silver formed of silicon nitride described in JP2004-334012A described ill the section of the related art was verified in Comparative Examples 3 to 5. As a result, it was found that in a case where the thickness of the silicon nitride layer was as thin as about 6 nm, sufficient durability could not be obtained, and in a case where the thickness was set to 16 nm, while durability was obtained, the antireflection performance was lowered, it was difficult to attain both durability and antireflection performance, and the film was not practical. Further, as shown in Comparative Example 7, in a case where the fluorocarbon layer (FLUORO SURF), which was not silane-coupled, was formed on the $SiO_2$ layer, sufficient durability could not be obtained.

In contrast, it was found that by adopting the constitution having the fluorocarbon layer of the monomolecular film formed by silane coupling of the present invention, sufficient durability could be obtained and good antireflection performance could be obtained.

EXPLANATION OF REFERENCES 1, 11, 21: antireflection film
2: substrate
4: interlayer
6: anchor layer
7: anchor region
7a: region in middle of alteration into anchor region
8: silver-containing metal layer
9: cap region
9a: precursor region of cap region
10, 15, 20: dielectric layer
12: silicon oxide layer (oxide layer)
13: magnesium fluoride layer
14: fluorocarbon layer
41: layer of high refractive index
42: layer of low refractive index
51, 52, 53: optical element
60: sample for durability test
62: glass substrate
63: Ge layer
64: Ag layer
65: first dielectric layer
66: second dielectric layer
67: third dielectric layer
100: imaging element
G1 to G5: lens group
GC: optical member
L11 to L51: lens
S1: aperture stop
Z1: optical axis

What is claimed is:

1. An antireflection film that is provided on a substrate and is formed by laminating an interlayer, a silver-containing metal layer containing silver, and a dielectric layer, in this order, on the substrate,
wherein the interlayer is a multilayer film having two or more layers, in which a layer of high refractive index having a relatively high refractive index and a layer of low refractive index having a relatively low refractive index are alternately laminated,
wherein the dielectric layer has a surface to be exposed to air and is a multilayer film having two or more layers including an oxide layer and a fluorocarbon layer, which is a self-assembled film that is formed by a silane coupling reaction to the oxide layer,
wherein the dielectric layer includes a silicon oxide layer, and a layer having a refractive index lower than a refractive index of the silicon oxide layer, and
wherein the layer having a refractive index lower than a refractive index of the silicon oxide layer is provided nearer to the silver-containing metal layer than the oxide layer.

2. The antireflection film according to claim 1, wherein the oxide layer is the silicon oxide layer.

3. The antireflection film according to claim 1, wherein the layer having a refractive index lower than the refractive index of the silicon oxide layer is a magnesium fluoride layer.

4. The antireflection film according to claim 3, wherein the magnesium fluoride layer is arranged closer to the silver-containing metal layer than the silicon oxide layer.

5. The antireflection film according to claim 1, wherein the surface to be exposed to air of the dielectric layer is formed of a fluorocarbon layer.

6. The antireflection film according to claim 1, wherein a thickness of the fluorocarbon layer is 20 nm or less.

7. The antireflection film according to claim 1, wherein a thickness of the silver-containing metal layer is 6 nm or less.

8. The antireflection film according to claim 1, further comprising:
an anchor layer provided between the silver-containing metal layer and the interlayer.

9. The antireflection film according to claim 1, further comprising:
an anchor region including an oxide of an anchor metal provided between the silver-containing metal layer and the interlayer; and
a cap region including an oxide of the anchor metal provided between the silver-containing metal layer and the dielectric layer.

10. A method for producing the antireflection film according to claim 1, the method comprising:
sequentially laminating the interlayer and the silver-containing metal layer on one surface of the substrate by a vapor phase growth method; and
laminating the oxide layer on the silver-containing metal layer by a vapor phase growth method, and then immersing at least a surface of the oxide layer in a solution including a silane coupling agent having a fluorocarbon group to form the fluorocarbon layer by self-organization through a silane coupling reaction to the surface of the oxide layer.

11. An optical element comprising:
the antireflection film according to claim 1.

12. An optical system comprising:
a group lens, which includes the optical element according to claim 11, and in which a surface of the optical element having the antireflection film provided thereon is arranged on outermost surfaces.

* * * * *